US012524833B2

(12) United States Patent
Oikawa et al.

(10) Patent No.: US 12,524,833 B2
(45) Date of Patent: Jan. 13, 2026

(54) X-RAY DIAGNOSIS APPARATUS, MEDICAL IMAGE PROCESSING APPARATUS, AND STORAGE MEDIUM

(71) Applicant: CANON MEDICAL SYSTEMS CORPORATION, Otawara (JP)

(72) Inventors: Hirona Oikawa, Nasushiobara (JP); Masahiro Ozawa, Sakura (JP); Hag Chang Lee, Otawara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 547 days.

(21) Appl. No.: 17/819,037

(22) Filed: Aug. 11, 2022

(65) Prior Publication Data
US 2023/0056033 A1    Feb. 23, 2023

(30) Foreign Application Priority Data

Aug. 17, 2021    (JP) .................. 2021-132576

(51) Int. Cl.
| | | |
|---|---|---|
| *G06T 5/10* | (2006.01) | |
| *A61B 6/00* | (2024.01) | |
| *A61B 6/12* | (2006.01) | |
| *A61B 6/46* | (2024.01) | |
| *A61B 6/50* | (2024.01) | |

(Continued)

(52) U.S. Cl.
CPC .............. *G06T 5/10* (2013.01); *A61B 6/5258* (2013.01); *G06T 5/20* (2013.01); *G06T 2207/10116* (2013.01); *G06T 2207/20081* (2013.01)

(58) Field of Classification Search
CPC ......... A61B 6/5258; A61B 6/12; A61B 6/461; A61B 6/504; A61B 6/505; A61B 6/5205; G06T 2207/10116; G06T 2207/20081; G06T 7/0012–0016; G06T 5/00–94
See application file for complete search history.

(56) References Cited

U.S. PATENT DOCUMENTS

| | | | |
|---|---|---|---|
| 9,974,507 B2 * | 5/2018 | Shiraishi ................ | A61B 6/481 |
| 10,456,095 B2 * | 10/2019 | Sakaguchi .............. | G06T 7/246 |

(Continued)

FOREIGN PATENT DOCUMENTS

| | | |
|---|---|---|
| JP | 2003-265450 A | 9/2003 |
| JP | 2006-263180 A | 10/2006 |

(Continued)

OTHER PUBLICATIONS

Zohora, Fatema Tuz. Foreign Element Detection in Chest X-ray Images. University of South Dakota, 2016. (Year: 2016).*

(Continued)

*Primary Examiner* — Gregory A Morse
*Assistant Examiner* — Ronde Lee Miller
(74) *Attorney, Agent, or Firm* — Oblon, McClelland, Maier & Neustadt, L.L.P.

(57) ABSTRACT

An X-ray diagnosis apparatus according to an embodiment includes processing circuitry configured: to detect an element from X-ray image data taken of an examined subject; to determine a parameter of multi-frequency processing on the basis of a detection result of the element; and to execute the multi-frequency processing on one or both of the X-ray image data and another piece of X-ray image data taken later than the X-ray image data, on the basis of the determined parameter.

18 Claims, 10 Drawing Sheets

(51) Int. Cl.
*G06T 5/20* (2006.01)
*G06T 11/00* (2006.01)

(56) References Cited

U.S. PATENT DOCUMENTS

| | | | |
|---|---|---|---|
| 2015/0317771 A1* | 11/2015 | Kato | G06T 5/10 |
| | | | 378/62 |
| 2016/0029989 A1* | 2/2016 | Nagae | A61B 6/487 |
| | | | 378/42 |
| 2017/0340302 A1* | 11/2017 | Wang | A61B 6/54 |
| 2018/0279986 A1* | 10/2018 | Nagae | A61B 6/503 |
| 2021/0369247 A1* | 12/2021 | Igarashi | A61B 8/54 |
| 2022/0172361 A1* | 6/2022 | Abe | A61B 6/481 |
| 2023/0056033 A1* | 2/2023 | Oikawa | A61B 6/5258 |
| 2023/0165552 A1* | 6/2023 | Takemoto | A61B 6/504 |
| | | | 378/62 |
| 2024/0161035 A1* | 5/2024 | Lyman | G16H 10/20 |

FOREIGN PATENT DOCUMENTS

| | | |
|---|---|---|
| JP | 2015-100543 A | 6/2015 |
| JP | 2015-208638 A | 11/2015 |
| JP | 2021-35493 A | 3/2021 |
| JP | 2021-69855 A | 5/2021 |
| WO | WO 2020/264317 A1 | 12/2020 |
| WO | WO-2021033741 A1 * | 2/2021 ............... A61B 6/12 |

OTHER PUBLICATIONS

Extended European Search Report issued on Jan. 16, 2023 in European Patent Application No. 22190646.4, 10 pages.

Japanese Office Action issued Mar. 4, 2025 in Japanese Patent Application No. 2021-132576, 3 pages.

* cited by examiner

| PARAMETER SET NUMBERS | EXAMINATION PROTOCOLS | IMAGE TAKING CONDITIONS | GROUPS OF OFFSET FREQUENCIES | GROUPS OF COEFFICIENTS |
|---|---|---|---|---|
| | | | | 111 |
| 1 | ... | ... | ... | ... |
| 2 | ... | ... | ... | ... |
| ⋮ | ⋮ | ⋮ | ⋮ | ⋮ |

MEMORY 11

X-RAY DIAGNOSIS APPARATUS, MEDICAL IMAGE PROCESSING APPARATUS, AND STORAGE MEDIUM

CROSS-REFERENCE TO RELATED APPLICATIONS

This application is based upon and claims the benefit of priority from Japanese Patent Application No. 2021-132576, filed on Aug. 17, 2021, the entire contents of which are incorporated herein by reference.

FIELD

Embodiments described herein relate generally to an X-ray diagnosis apparatus, a medical image processing apparatus, and a program.

BACKGROUND

Conventionally, multi-frequency processing is known as image processing performed by X-ray diagnosis apparatuses. In the multi-frequency processing, bandpass signals indicating differences of an original image and a plurality of blurred images are extracted, so as to calculate an emphasis signal by applying a coefficient to the bandpass signals and adding up the results. Accordingly, by independently emphasizing a plurality of frequency band signals, it is possible to realize unrestricted emphasized characteristics.

Optimal values of parameters used in the multi-frequency processing may vary depending on elements included in an imaging field of view or the like. For this reason, when the same set of parameters is used in multi-frequency processing even though the elements included in an imaging field of view change due to moving of an X-ray radiated region or moving of the position of a device during a manipulation of a medical doctor, for example, it may not be possible to acquire X-ray image data having appropriate image quality.

DETAILED DESCRIPTION

An X-ray diagnosis apparatus including processing circuitry configured: to detect an element from X-ray image data taken of an examined subject; to determine a parameter of multi-frequency processing on the basis of a detection result of the element; and to execute the multi-frequency processing on one or both of the X-ray image data and another piece of X-ray image data taken later than the X-ray image data, on the basis of the parameter.

Exemplary embodiments of an X-ray diagnosis apparatus, a medical image processing apparatus, and a program will be explained in detail below, with reference to the accompanying drawings.

First Embodiment

Figure 1:
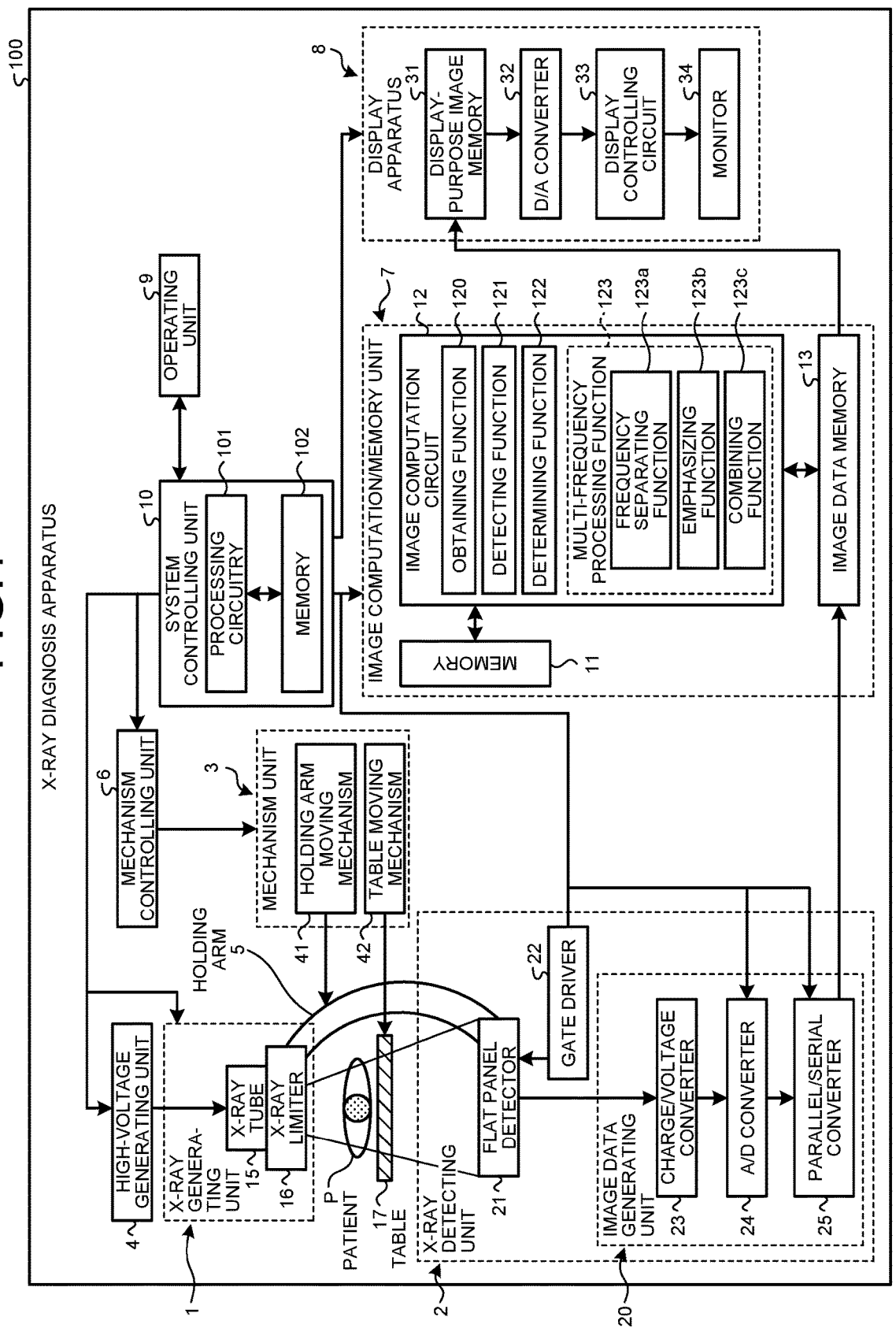
FIG. 1 is a block diagram illustrating an exemplary configuration of an X-ray diagnosis apparatus according to a first embodiment.

FIG. 1 is a block diagram illustrating an exemplary configuration of an X-ray diagnosis apparatus 100 according to a first embodiment. The X-ray diagnosis apparatus 100 is configured to generate X-ray image data taken of an examined subject (hereinafter, "patient") P by emitting X-rays onto the patient P. In this situation, the patient P is not included in the X-ray diagnosis apparatus 100. For example, the X-ray diagnosis apparatus 100 is used for medical examinations and treatment of a circulatory organ, a gastrointestinal tract, a urinary organ, orthopedics, Interventional Radiology (IVR), and/or the like. However, possible use of the X-ray diagnosis apparatus 100 is not limited to these examples.

As illustrated in FIG. 1, the X-ray diagnosis apparatus 100 includes an X-ray generating unit 1, an X-ray detecting unit 2, a mechanism unit 3, a high-voltage generating unit 4, a holding arm 5, a mechanism controlling unit 6, an image computation/memory unit 7, a display apparatus 8, an operating unit 9, a system controlling unit 10, and a table 17.

Further, the X-ray generating unit 1 includes an X-ray tube 15 and an X-ray limiter 16. The X-ray detecting unit 2 includes an image data generating unit 20, a Flat Panel Detector (FPD) 21, and a gate driver 22. The mechanism unit 3 includes a holding arm moving mechanism 41 and a table moving mechanism 42. The image data generating unit 20 includes a charge/voltage converter 23, an Analog/Digital (A/D) converter 24, and a parallel/serial converter 25.

The high-voltage generating unit 4 is a high-voltage power source configured, under control of the system controlling unit 10, to generate high voltage and to supply the generated high voltage to the X-ray tube 15.

The X-ray tube 15 is configured to generate X-rays by using the high voltage supplied thereto from the high-voltage generating unit 4.

The X-ray limiter 16 is configured to limit the X-rays generated by the X-ray tube 15 so as to be selectively emitted onto a region of interest of the patient P.

The holding arm 5 is configured to hold the X-ray generating unit 1 and the X-ray detecting unit 2. On the two ends thereof, the holding arm 5 is configured to support the X-ray generating unit 1 and the X-ray detecting unit 2 and may be referred to as a C-arm because the shape thereof is similar to the letter C. Further, although FIG. 1 depicts the single holding arm 5 being included, the X-ray diagnosis apparatus 100 may have a biplane structure where an Ω-arm is further included.

Under the control of the system controlling unit 10, the mechanism controlling unit 6 is configured to adjust rotation and moving of the holding arm 5 and moving of the table 17, by controlling the holding arm moving mechanism 41 and the table moving mechanism 42.

The holding arm moving mechanism 41 is a mechanism configured to rotate and move the holding arm 5 and includes a motor and an actuator (not illustrated), or the like.

The table moving mechanism 42 is a mechanism configured to move the table 17 and includes a motor and an actuator (not illustrated), or the like.

The table 17 has the patient P placed thereon. While having the patient P placed thereon, the table 17 can be moved by the table moving mechanism 42 in up-and-down directions, front-and-back directions, and diagonal directions.

The X-ray detecting unit 2 is configured to detect X-rays that have passed through the patient P and to generate the X-ray image data based on a detection result.

More specifically, the flat panel detector 21 is configured to detect the X-rays that have passed through the patient P and to transmit the detection result to the image data generating unit 20. The flat panel detector 21 includes, for example, a detection film, a pixel capacitor unit, a Thin Film Transistor (TFT), and the like. The flat panel detector 21 is an example of an X-ray detector according to the present embodiment.

Under control of the system controlling unit 10, the gate driver 22 is configured to supply drive voltage to a gate terminal of the TFT so as to read electric charge accumulated in the flat panel detector 21 as an X-ray image signal.

The image data generating unit 20 is configured to generate the X-ray image data from a detection signal detected by the flat panel detector 21 and to store the generated X-ray image data into an image data memory 13. For example, the image data generating unit 20 is configured to generate the X-ray image data by performing a current/voltage conversion, an A/D conversion, a parallel/serial conversion and/or the like on the detection signal detected by the flat panel detector 21.

More specifically, the charge/voltage converter 23 is configured to convert the electric charge read from the flat panel detector 21 into voltage. The A/D converter 24 is configured to convert the output of the charge/voltage converter 23 to a digital signal (digital data). The parallel/serial converter 25 is configured to convert the detection signal converted as the digital signal into time-series data elements.

The image computation/memory unit 7 is configured to correct and store therein the X-ray image data generated by the image data generating unit 20. In the present embodiment, when the X-ray image data is distinguished between before the correction and after the correction, the X-ray image data generated by the image data generating unit 20 will be referred to as original image data, whereas the data obtained as a result of the image computation/memory unit 7 correcting the original image data will be referred to as display-purpose X-ray image data.

The image computation/memory unit 7 includes a memory 11, an image computation circuit 12, and the image data memory 13.

The memory 11 is configured to store therein programs that correspond to various types of functions and are to be read and executed by the image computation circuit 12. Further, the memory 11 is configured to store therein data used in various types of processes performed by the image computation circuit 12. For example, the memory 11 is configured to store therein information indicating a status of whether a parameter automatic setting function for the multi-frequency processing is turned on or off, a trained model, and the like.

For example, the memory 11 is realized by using a semiconductor memory element such as a Random Access Memory (RAM) or a flash memory, or a hard disk, an optical disk, or the like.

The image computation circuit 12 is configured to generate the display-purpose X-ray image data by performing an image processing process on the original image data generated by the image data generating unit 20 and to store the generated display-purpose X-ray image data into the image data memory 13.

In the present embodiment, the image processing process performed by the image computation circuit 12 is multi-frequency processing. Further, the image computation circuit 12 may further perform other image processing processes besides the multi-frequency processing on the original image data. Further, the image computation circuit 12 according to the present embodiment is provided with the parameter automatic setting function for the multi-frequency processing corresponding to elements included in an imaging Field Of View (FOV).

More specifically, the image computation circuit 12 includes an obtaining function 120, a detecting function 121, a determining function 122, a frequency separating function 123*a*, an emphasizing function 123*b*, and a combining function 123*c*. Further, the frequency separating function 123*a*, the emphasizing function 123*b*, and the combining function 123*c* will collectively be referred to as a multi-frequency processing function 123. Details of the functions will be explained later.

The image computation circuit 12 is represented by one or more processors configured to realize the functions corresponding to the programs, by reading and executing the programs from the memory 11, for example. In other words, the circuits that have read the programs have the functions corresponding to the read programs.

The display apparatus 8 includes a display-purpose image memory 31, a Digital/Analog (D/A) converter 32, a display controlling circuit 33, and a monitor 34.

The display-purpose image memory 31 is configured to temporarily store therein a part of the display-purpose X-ray image data generated by the image computation circuit 12 that has been read by the display controlling circuit 33.

The D/A converter 32 is configured to perform a D/A conversion on the display-purpose X-ray image data.

The display controlling circuit 33 is a processor configured to control the monitor 34 and is configured to read the display-purpose X-ray image data generated by the image computation circuit 12 from the image data memory 13 and to cause the D/A converter 32 to convert the read data, before causing the monitor 34 to display the converted data. Further, the display controlling circuit 33 may also cause the monitor 34 to display various types of Graphical User Interfaces (GUIs).

The monitor 34 is configured to display an X-ray image based on the display-purpose X-ray image data and a GUI used for receiving instructions from an operator. The monitor 34 is realized by using a liquid crystal display device, an Organic Electroluminescence (OEL) display device, or the like.

The operating unit 9 is configured to receive various types of instructions and inputs of information from the operator. For example, the operating unit 9 is realized by using a trackball, a switch button, a mouse, a keyboard, a touchpad on which input operations can be performed by touching an operation surface thereof, a touch screen in which a display screen and a touchpad are integrated together, a contactless input circuit using an optical sensor, an audio input circuit, and/or the like. In an example where the operating unit 9 is a touch screen, the monitor 34 and a touchpad may be integrated together.

The operating unit 9 is connected to the system controlling unit 10 and is configured to convert an input operation received from the operator into an electrical signal and to output the electrical signal to the system controlling unit 10. For example, the operating unit 9 is configured to receive an operation performed by the operator to turn on or off the parameter automatic setting function for the multi-frequency processing. Upon receipt of the operation to turn on or off the parameter automatic setting function for the multi-frequency processing, the operating unit 9 is configured to send specifics of the received operation to the system controlling unit 10.

Further, the operating unit 9 is configured to receive operations performed by the operator to input image taking conditions, examination protocols, and the like. The operating unit 9 is configured to send specifics of the received operations to the system controlling unit 10. Further, the system controlling unit 10 is configured to send the specifics of the various types of operations obtained from the operating unit 9 to the image computation circuit 12.

The image taking conditions include settings related to an imaging system, an imaging field of view, a magnification ratio, and an X-ray condition.

The imaging system denotes definition items or information related to a positional relationship between a apparatus used in an imaging process and the patient P and/or a positional relationship between apparatuses used in an imaging process. The positional relationship between a apparatus used in the imaging process and the patient P and the positional relationship between the apparatuses used in an imaging process may be referred to as imaging geometry. The apparatuses used in an imaging process may be the X-ray tube 15 and the flat panel detector 21, for example.

The imaging system denotes, for example, the distance between an X-ray source and an image receptor called a Source Image Distance (SID), a Source Skin Distance (SSD), the height of the table 17, and a rotation amount of the holding arm 5.

The magnification ratio is designated by the operator while using a function called "Live Zoom", for example. "Live Zoom" is the function that enlarges or reduces an X-ray image rendered on the monitor 34 as a result of a user operating on the operating unit 9. The X-ray condition is a setting value or information related to intensities of the X-rays used in an imaging process. Examples of the X-ray condition include a setting value of an X-ray tube voltage (kV) to be applied to the X-ray tube 15.

The examination protocols are information indicating a procedure of a medical examination performed by the X-ray diagnosis apparatus 100 and define an imaged body site and a sequential order in which various imaging processes are to be performed. For example, a plurality of examination protocols may be stored in advance in the memory 11, so that the operator can select, via the operating unit 9, certain examination protocols to be used for imaging the patient P.

In this situation, the operating unit 9 in the present disclosure does not necessarily have to include physical operation component parts such as a mouse, a keyboard, and/or the like. For instance, possible examples of the operating unit 9 include electrical signal processing circuitry configured to receive an electrical signal corresponding to an input operation from an external input device provided separately from the X-ray diagnosis apparatus 100 and to output the electrical signal to a controlling circuit. The operating unit 9 may be referred to as an input interface.

The system controlling unit 10 is configured to control imaging processes performed by the X-ray diagnosis apparatus 100. The system controlling unit 10 includes processing circuitry 101 and a memory 102, for example.

The processing circuitry 101 is represented by one or more processors configured to execute the imaging processes performed by the X-ray diagnosis apparatus 100. Further, by controlling various types of constituent elements of the X-ray diagnosis apparatus 100, the processing circuitry 101 is configured to control the entirety of the X-ray diagnosis apparatus 100. For example, the processing circuitry 101 is configured to send the specifics of the various types of operations received by the operating unit 9 from the operator, to the image computation circuit 12.

The memory 102 is configured to store therein programs that correspond to various types of functions and are to be read and executed by the processing circuitry 101. For example, the memory 102 is realized by using a semiconductor memory element such as a RAM or a flash memory, or a hard disk, an optical disk, or the like.

In the description above, an example was explained in which the "processors" are configured to read and execute the programs corresponding to the functions from the memory 11 and the memory 102; however, possible embodiments are not limited to this example. The term "processor" denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). When the processors are each a CPU, for example, the processors are configured to realize the functions by reading and executing the programs saved in the memory 11 and the memory 102. Alternatively, when the processors are each an ASIC, instead of having the programs saved in the memory 11 and the memory 102, the functions are directly incorporated into the circuits of the processors as logic circuits. Further, the processors according to the present embodiments do not each necessarily have to be structured as a single circuit. It is also acceptable to structure one processor by combining together a plurality of independent circuits, so as to realize the functions thereof. Further, two or more of the constituent elements in FIG. 1 may be integrated together in a single processor so as to realize the functions thereof.

Next, functions included in the image computation circuit 12 according to the present embodiment will be explained.

The obtaining function 120 is configured to obtain the original image data taken of the patient P, from the image data memory 13.

The detecting function 121 is configured to detect elements from the original image data taken of the patient P.

In the present embodiment, the elements are objects rendered in the X-ray image data and, more specifically, are each a body tissue of the patient P or a medical device. Examples of medical devices rendered in the X-ray image data include devices such as a catheter, a guide wire, and a stent used in IVR, for example. Examples of body tissues rendered in the X-ray image data include a bone, a blood vessel, the diaphragm, and a lung field.

More specifically, the detecting function 121 is configured to detect the types of the elements rendered in the original image data obtained by the obtaining function 120 and image regions in which the elements are rendered. In the present embodiment, the detecting function 121 is configured to obtain a segmentation result of the original image data corresponding to the elements, by using a trained model.

Figure 2:
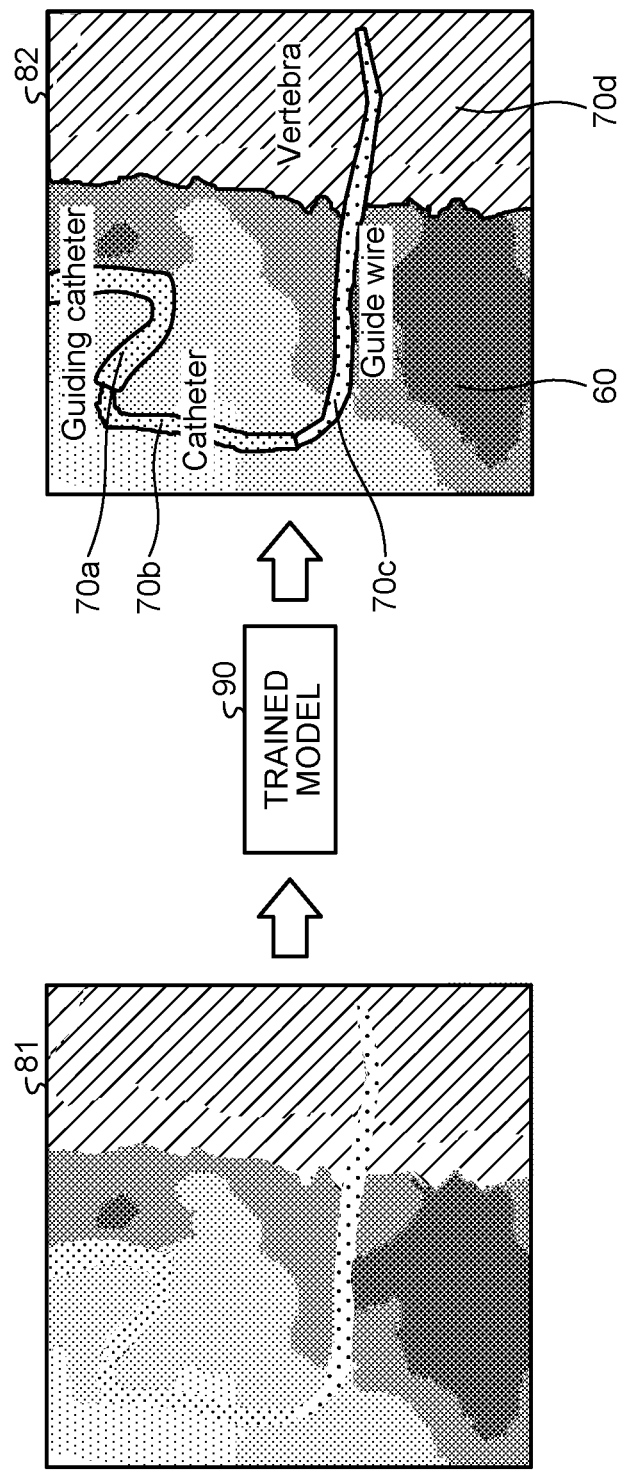
FIG. 2 is a drawing illustrating an example of segmentation of original image data according to the first embodiment.

FIG. 2 is a drawing illustrating an example of segmentation of original image data 81 according to the first embodiment. As illustrated in FIG. 2, when the original image data 81 is input to a trained model 90, labels indicating the types of the elements rendered in the original image data 81 and image regions rendering the elements are output. In FIG. 2, a segmentation result of the original image data 81 is presented as region divided image data 82.

The trained model 90 is a model that has learned a plurality of pieces of learning-purpose X-ray image data and segmentation results defined with elements corresponding to the plurality of pieces of learning-purpose X-ray image data that are kept in correspondence with one another. The trained model 90 is, for example, a trained model generated through deep learning such as a neural network or through other types of apparatus learning. As for the method of the deep learning, it is possible to adopt a Deep Convolutional Neural Network (DCNN), a Convolutional Neural Network (CNN), or a Recurrent Neural Network (RNN); however, possible embodiments are not limited to these examples. For instance, the trained model 90 is structured with a neural network and trained parameter data.

It is assumed that the trained model 90 is stored in the memory 11, for example. The detecting function 121 is configured to read the trained model 90 from the memory 11 and to input the original image data 81 thereto. Alternatively, the detecting function 121 may have the trained model 90 incorporated therein.

The trained model 90 may have been generated by an information processing apparatus other than the X-ray diagnosis apparatus 100. Alternatively, the X-ray diagnosis apparatus 100 may include a learning function configured to generate the trained model 90.

Further, examples of the trained model 90 in the present embodiment include a "self-training model" configured to further update an internal algorithm of the trained model 90 as a result of a user giving feedback about resultants output by the trained model 90 of any of those types.

In the example in FIG. 2, detected as the elements are a guiding catheter, a catheter, a guide wire, and the vertebra.

In the original image data 81, the area rendering the guiding catheter is indicated as an image region 70a in the region divided image data 82. Further, the area rendering the catheter is indicated as an image region 70b in the region divided image data 82. The area rendering the guide wire is indicated as an image region 70c in the region divided image data 82. The area rendering the vertebra is indicated as an image region 70d in the region divided image data 82. In the following sections, when not particularly distinguished from one another, the image regions 70a to 70d rendering the respective elements will simply be referred to as image regions 70.

Further, in the original image data 81, the region from which no element is detected will be referred to as a background region 60.

Returning to the description of FIG. 1, the determining function 122 is configured to determine parameters of the multi-frequency processing, on the basis of the result of the element detection by the detecting function 121.

The multi-frequency processing is a process of adjusting an emphasized characteristic with respect to each of the frequency bands of spatial frequencies. The multi-frequency processing includes a frequency separation process and an emphasized characteristic adjusting process.

The frequency separation process is a process of generating, from the X-ray image data, a plurality of pieces of frequency band data separated in correspondence with a plurality of frequency bands. The frequency separation process is a process of generating the plurality of pieces of frequency band data respectively including mutually-different frequency bands and background data, by applying a Low Pass Filter (LPF) to the X-ray image data at stages and calculating a difference from an LPF-processed image at an immediately preceding stage.

The emphasized characteristic adjusting process is a process of emphasizing or suppressing the plurality of pieces of frequency band data by applying a coefficient to each of the plurality of pieces of frequency band data.

The parameters of the multi-frequency processing include threshold values used in the frequency separation process and the coefficients used in the emphasized characteristic adjusting process. The threshold values used in the frequency separation process may be, for example, cutoff frequencies of the low pass filter used for separating the frequency bands.

More specifically, the determining function 122 is configured to determine the parameters of the multi-frequency processing, on the basis of the types of the elements detected from the original image data 81 and the sizes of the image regions 70 from which the elements were detected.

For example, in X-ray image data, generally speaking, the bigger image changes or the finer image patterns a region has, the higher frequency band corresponds thereto. For this reason, the lower percentage of the original image data 81 is accounted for by an image region 70, the higher frequency region corresponds thereto. Conversely, the higher percentage of the original image data 81 is accounted for by an image region 70, the lower frequency region corresponds thereto.

By using the abovementioned characteristics of the frequency band data as a premise, the determining function 122 is configured to calculate, with respect to each of the elements, what percentage of the original image data 81 is accounted for by the image region 70 rendering an element and to further determine the cutoff frequencies of the low pass filter on the basis of the percentages.

Figure 3:
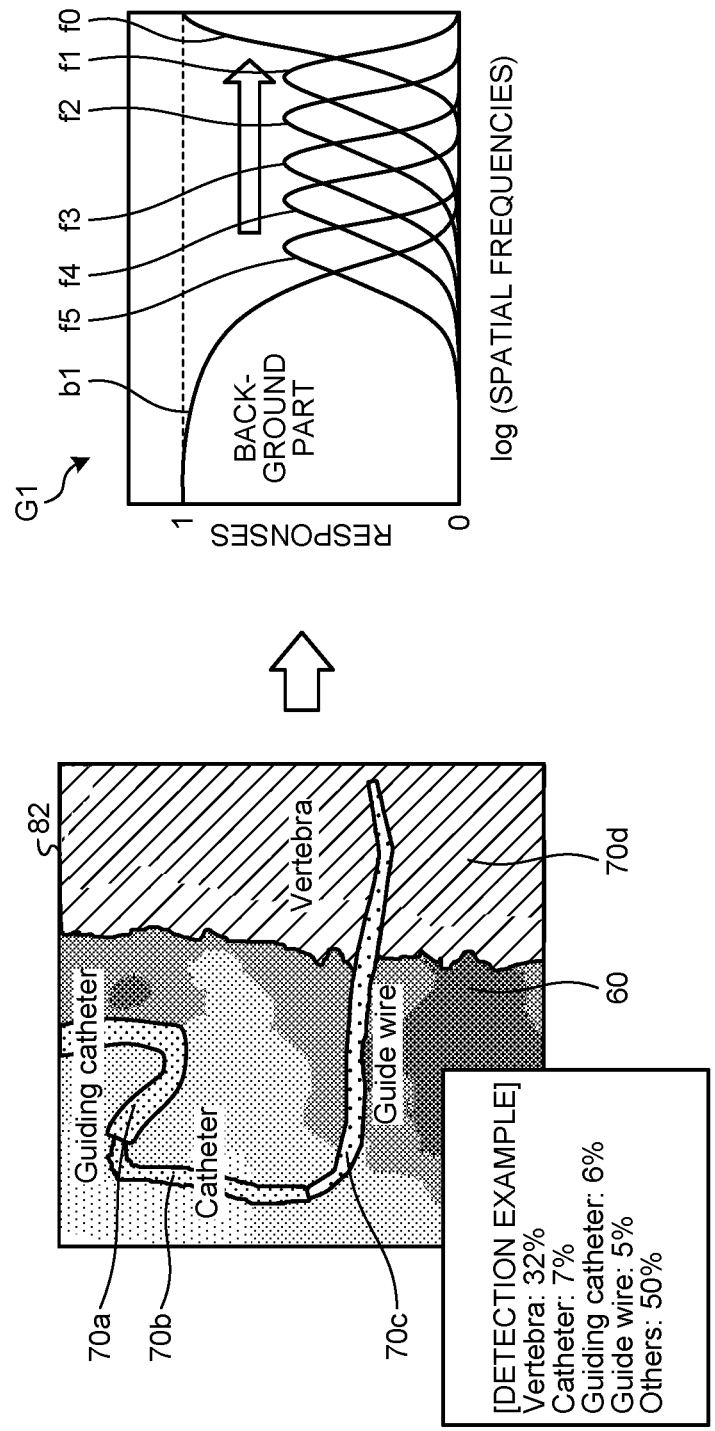
FIG. 3 is a drawing illustrating an example of a frequency separation process according to the first embodiment.

FIG. 3 is a drawing illustrating an example of a frequency separation process according to the first embodiment. As illustrated in FIG. 3, the determining function 122 is configured to calculate the percentage of each of the image regions 70 in area within the region divided image data 82.

The percentage of each of the image regions 70 in area indicates what percentage of the number of pixels in the entirety of the region divided image data 82 is accounted for by the number of pixels in each of the image regions 70. In the example in FIG. 3, the image region 70d representing the vertebra accounts for 32%, the image region 70b representing the catheter accounts for 7%, the image region 70a representing the guiding catheter accounts for 6%, the image region 70c representing the guide wire accounts for 5%, and the remaining background region 60 accounts for 50%. From these percentage values, it is understood that the majority of the original image data 81 is accounted for by the image region 70d representing the vertebra and the background region 60 and that there are a plurality of image regions, namely 70b, 70a, and 70c, that each have a relatively small area.

In the graph G1 in FIG. 3, the horizontal axis expresses spatial frequencies, whereas the vertical axis expresses frequency responses. In the example in FIG. 3, the determining function 122 is configured to separate frequency band data f0 to f5 and background data b1, by applying the low pass filter at six stages. However, possible division numbers for the frequency band data f0 to f5 are not limited to this example.

For instance, the determining function 122 is configured to determine the cutoff frequencies of the low pass filter in such a manner that the larger number of image regions 70 correspond to higher frequency regions, the more finely the frequency band data f0 to f5 are separated in higher frequency bands. In the example in FIG. 3, a larger number of the frequency band data f0 to f5 is present on the higher frequency region positioned on the right half of the graph G1 along the horizontal axis. The reason is that the determining function 122 has set more cutoff frequencies for separating the pieces of frequency band data f0 to f5 on the higher frequency side. In this manner, by separating the frequency band data f0 to f5 while applying finer granularity to the higher frequency side, it is possible to adjust, in a more detailed manner, degrees of emphases imposed on the objects on the higher frequency side in the X-ray image data, i.e., on smaller image regions 70.

Further, depending on the types of the detected elements, it may be possible to estimate corresponding frequency bands. For example, generally speaking, because catheters, guiding catheters, and guide wires have slender shapes, the image regions rendered in X-ray image data are smaller and thus correspond to higher frequency bands. In contrast, generally speaking, because blood vessels have fatter shapes than devices like catheters, the image regions rendered in X-ray image data are at medium levels and thus correspond to medium frequency bands lower than those of the devices. Accordingly, the determining function 122 may determine the cutoff frequencies in accordance with the types and the quantity of the detected elements. When this configuration is adopted, the memory 11 may store therein a table keeping various types of elements in correspondence with frequency bands.

Further, in accordance with the types of the detected elements, the determining function 122 is configured to determine the coefficients for emphasizing or suppressing each of the pieces of frequency band data f0 to f5 and background data b1. In the multi-frequency processing, because it is possible to apply the coefficients having mutually-different values to the frequency band data f0 to f5 and the background data b1, the determining function 122 is able to determine as many coefficients as the number of the pieces of frequency band data f0 to f5 and background data b1 separated by the low pass filter provided at stages.

Figure 4:
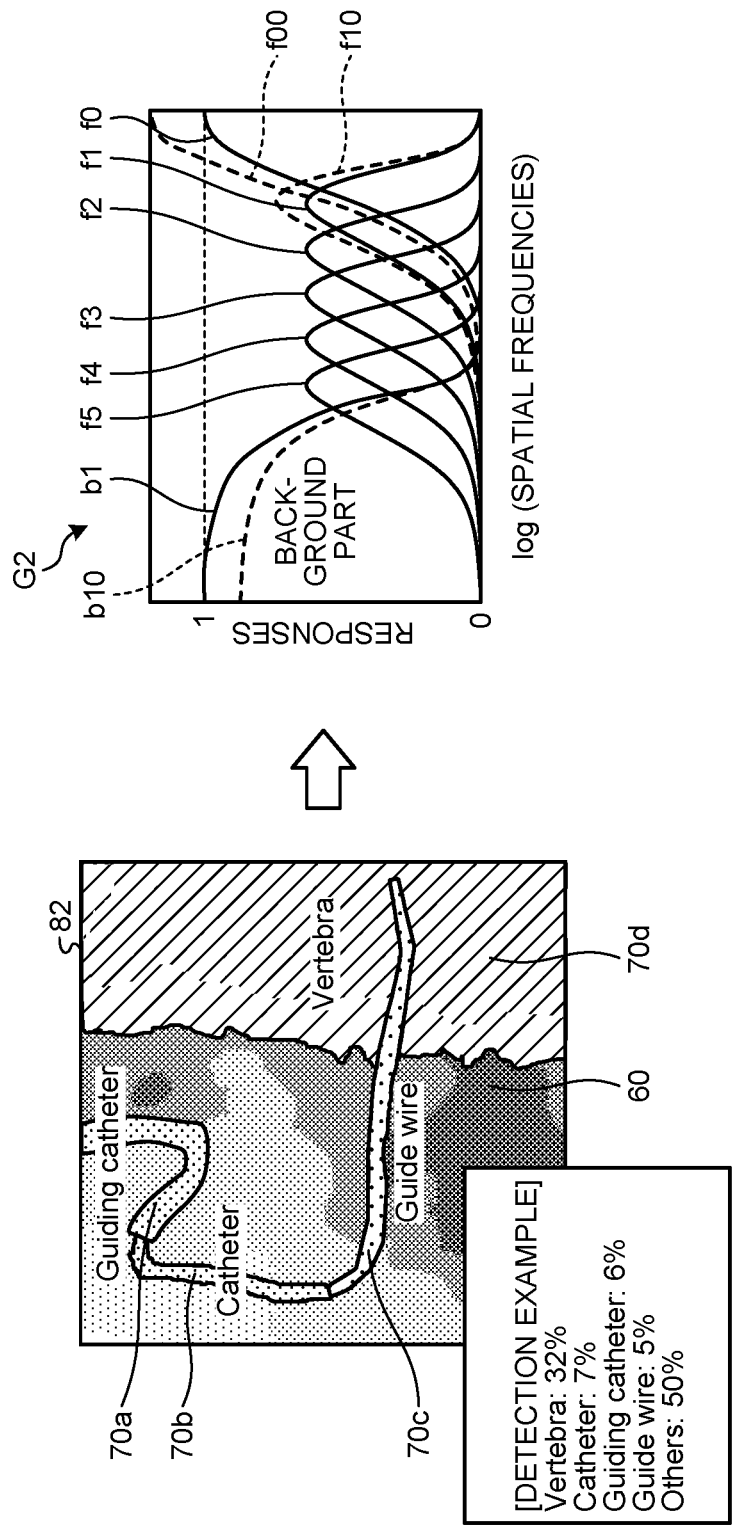
FIG. 4 is a drawing illustrating an example of an emphasized characteristic adjusting process according to the first embodiment.

FIG. 4 is a drawing illustrating an example of the emphasized characteristic adjusting process according to the first embodiment. In the graph G2 in FIG. 4, the frequency band data f0 to f5 and the background data b1 generated from the original image data 81 and observed before the coefficients are applied thereto are indicated with solid lines. In contrast, post-correction frequency band data f00 and f10 and background data b10 that have been emphasized or suppressed by applying the coefficients thereto are indicated with broken lines.

As observed from the region divided image data 82 in FIG. 4, in the situation where a bone such as the vertebra is rendered in the X-ray image data, when the bone overlaps with a device such as the catheter, visibility of the device would be lowered in the overlapping region.

In this situation, the determining function 122 is configured to prevent the display of the image region 70d corresponding to the vertebra from being emphasized, by causing the coefficients on the lower frequency side to be smaller than 1. In the example of the graph G2 in FIG. 4, the background data b10 to which the coefficients have been applied has lower frequency responses than the pre-adjustment background data b1. In other words, the determining function 122 is configured to determine the coefficients in accordance with the combination of the types of the detected elements.

Further, when a slender device such as the guide wire is detected from the original image data 81, the determining function 122 is configured to determine the coefficients to be applied to the pieces of frequency band data f0 to f5, in such a manner that more emphasis is applied to the higher frequency side of the frequency band data f0 to f5. In the example in FIG. 4, the determining function 122 has applied the largest coefficient to the frequency band data f0 in the highest frequency position and has applied the second largest coefficient to the frequency band data f1 in the second highest frequency position.

Further, the determining function 122 may be configured to identify the frequency bands to be emphasized in accordance with the types of the detected elements or may be configured to identify the frequency bands to be emphasized on the basis of what percentage of the original image data 81 is accounted for by each of the image regions 70. For example, when a detected element is a blood vessel, the determining function 122 may cause the coefficients applied to the frequency band data f2 and f3 corresponding to the medium frequency bands among the frequency band data f0 to f5 illustrated in FIG. 4 to be larger than the coefficients applied to the other pieces of frequency band data.

An automatic setting process of the parameters for the multi-frequency processing performed by the detecting function 121 and the determining function 122 is executed when the parameter automatic setting function for the multi-frequency processing is turned on. The parameter automatic setting function for the multi-frequency processing can be switched on and off by operations of the operator received by the operating unit 9 (explained later). The status of whether the parameter automatic setting function for the multi-frequency processing is switched on or off is stored in the memory 11, for example. The detecting function 121 and the determining function 122 are configured to judge whether the parameter automatic setting function for the multi-frequency processing is switched on or off by referring to the memory 11 and configured to perform the element detecting process and the parameter determining process described above when the function is determined to be on.

Returning to the description of FIG. 1, the multi-frequency processing function 123 is configured to execute the multi-frequency processing on the original image data 81, on the basis of the determined parameters. As explained above, the multi-frequency processing function 123 includes the frequency separating function 123a, the emphasizing function 123b, and the combining function 123c.

The frequency separating function 123a is configured to separate the plurality of pieces of frequency band data f0 to f5 and the background data b1, on the basis of the parameters determined by the determining function 122. More specifically, the frequency separating function 123a is configured to separate the plurality of pieces of frequency band data f0 to f5 and the background data b1, by applying the low pass filter at stages, while using as many cutoff frequencies as the number of pieces of frequency band data f0 to f5 and background data b1 subject to the separation determined by the determining function 122.

Further, the emphasizing function 123b is configured to emphasize or suppress the pieces of frequency band data f0 to f5 and the background data b1, by applying the coefficients determined by the determining function 122 to the plurality of pieces of frequency band data f0 to f5 and the background data b1 separated by the frequency separating function 123a.

The combining function 123c is configured to generate the display-purpose X-ray image data, by combining together the plurality of pieces of frequency band data f00, f10, and f2 to f5 and the background data b10 resulting from the emphasized characteristic adjusting process performed by the emphasizing function 123b. The combining function 123c is configured to save the generated display-purpose X-ray image data into the image data memory 13.

Next, a flow in a process performed by the X-ray diagnosis apparatus 100 configured as described above will be explained.

Figure 5:
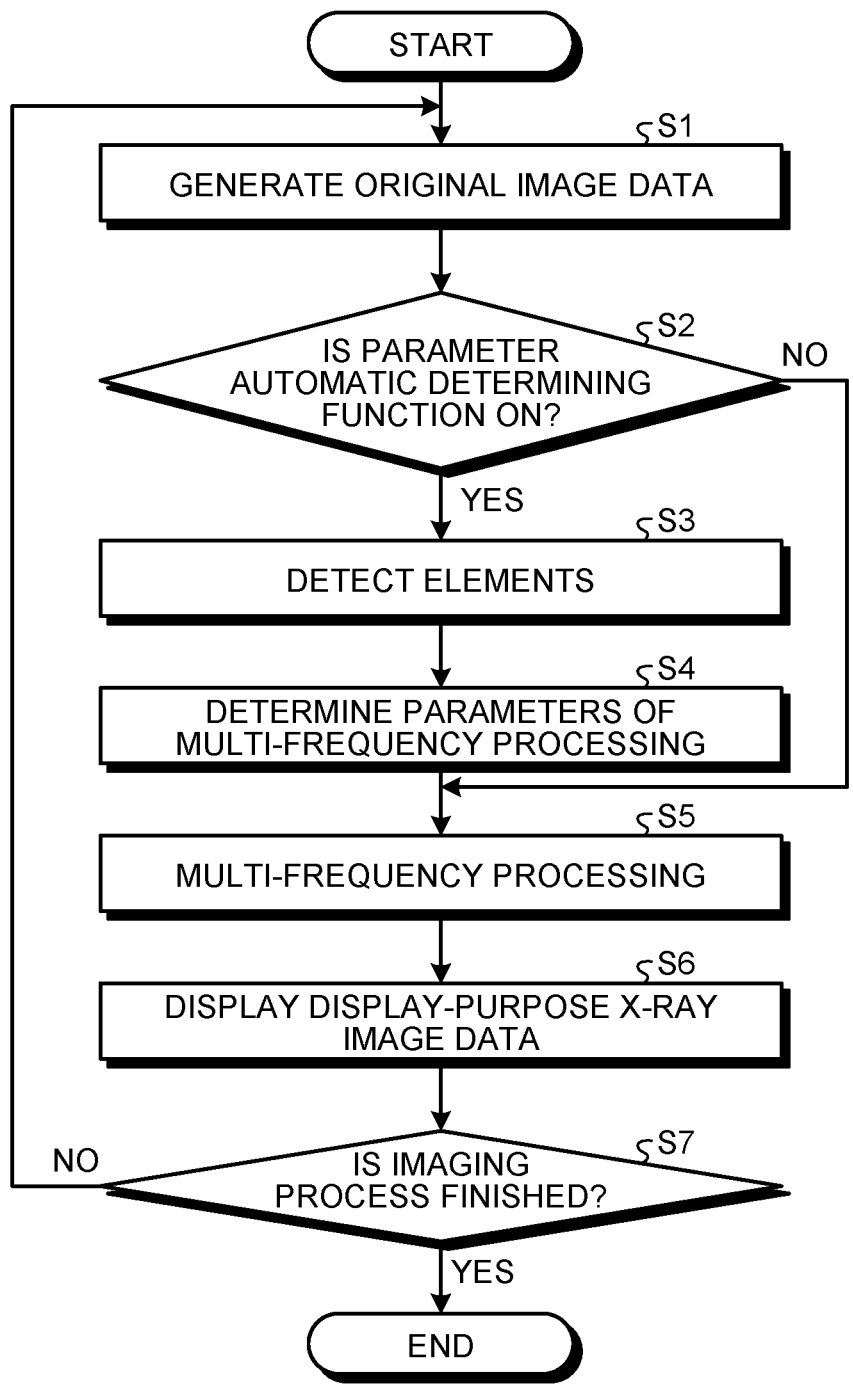
FIG. 5 is a flowchart illustrating an example of a flow in multi-frequency processing according to the first embodiment.

FIG. 5 is a flowchart illustrating an example of the flow in the multi-frequency processing according to the first embodiment. The process in this flowchart is started when an imaging process involving the X-ray emission onto the patient P is started under the control of the system controlling unit 10.

To begin with, the image data generating unit 20 generates the original image data 81 from the detection signal detected by the flat panel detector 21 (step S1). The obtaining function 120 obtains the original image data 81 generated by the image data generating unit 20.

Subsequently, the detecting function 121 judges whether or not the parameter automatic setting function for the multi-frequency processing is turned on (step S2).

When the parameter automatic setting function for the multi-frequency processing is turned on (step S2: Yes), the detecting function 121 detects elements from the original image data 81 obtained by the obtaining function 120, by using the trained model 90 (step S3).

After that, the determining function 122 determines the parameters of the multi-frequency processing, on the basis of the types of the elements detected from the original image data 81 and the sizes of the image regions 70 from which the elements were detected (step S4).

Further, the multi-frequency processing function 123 generates display-purpose X-ray image data, by executing the multi-frequency processing on the original image data 81 while using the determined parameters (step S5).

Subsequently, the display controlling circuit 33 causes the monitor 34 to display the generated display-purpose X-ray image data (step S6).

On the contrary, when the parameter automatic setting function for the multi-frequency processing is turned off (step S2: No), the processes of the detecting function 121 and the determining function 122 at steps S3 and S4 will not be performed. In that situation, in the process at step S6, the multi-frequency processing function 123 generates display-purpose X-ray image data, by executing the multi-frequency processing on the original image data 81 while using predetermined parameters. The predetermined parameters are stored in the memory 11, for example.

After that, when the imaging process for the patient P is continued (step S7: No), the processes at steps S1 through S6 are repeatedly performed. In the present embodiment, for example, the obtaining function 120 repeatedly obtains a new frame of the original image data 81. Every time a new frame of the original image data 81 is obtained, the detecting function 121 repeatedly performs the element detecting process on the newly-obtained original image data 81. Further, in conjunction with the element detecting process, the determining function 122 repeatedly performs the parameter determining process. After that, the multi-frequency processing function 123 repeatedly executes the multi-frequency processing on the basis of the repeatedly-determined parameters. As explained herein, because the processes are repeatedly performed by the functional units every time a new frame of the original image data 81 is obtained, it is possible to apply, in a real-time manner, the multi-frequency processing to the original image data 81 currently being taken.

After that, when the imaging process for the patient P is finished (step S7: Yes), the processes in this flowchart end.

As explained above, the X-ray diagnosis apparatus 100 according to the present embodiment is configured to detect the elements from the original image data 81 taken of the patient P, to determine the parameters of the multi-frequency processing on the basis of the result of the element detection, and to execute the multi-frequency processing on the original image data 81 on the basis of the determined parameters. Consequently, the X-ray diagnosis apparatus 100 according to the present embodiment is able to determine the appropriate parameters of the multi-frequency processing in accordance with the elements included in the imaging field of view.

For example, depending on the elements included in the imaging field of view or the like, optimal values of the parameters used in the multi-frequency processing may vary. For this reason, if the same set of parameters were used in the multi-frequency processing even though the elements included in the imaging field of view change due to moving of an X-ray radiated region or moving of the position of a device during the manipulation of a medical doctor, for example, it might not be possible to acquire display-purpose X-ray image data having appropriate image quality. In contrast, the X-ray diagnosis apparatus 100 according to the present embodiment is capable of executing the multi-frequency processing by using the parameters determined in accordance with the post-change elements, even when the elements rendered in the original image data 81 change due to changes of the imaged region or moving of the positions of the devices. It is therefore possible to maintain the image quality of the display-purpose X-ray image data.

In particular, when an IVR examination or the like is performed in which X-ray images taken during the manipulation of a medical doctor are displayed in a real-time manner, the values of the parameters suitable for displaying the devices may change, due to moving of the X-ray radiated region during the imaging process or because the positions of the devices such as the catheter move within the imaging field of view due to the manipulation of the medical doctor. In those situations, the X-ray diagnosis apparatus 100 according to the present embodiment is configured to automatically update the parameters with appropriate values, in accordance with the elements included in the imaging field of view. It is therefore possible to maintain visibility of the devices in the X-ray images without the user having to adjust the parameters from time to time.

Further, in the present embodiment, the multi-frequency processing includes the frequency separation process of generating the plurality of pieces of frequency band data f0 to f5 separated in correspondence with the plurality of frequency bands, from the original image data 81. The parameters of the multi-frequency processing include the threshold values used in the frequency separation process. The X-ray diagnosis apparatus 100 according to the present embodiment is configured to separate the plurality of pieces of frequency band data f0 to f5 on the basis of the determined threshold values. Because the X-ray diagnosis apparatus 100 according to the present embodiment is capable of appropriately performing the frequency separation process in accordance with the elements rendered in the original image data 81, it is possible to improve the image quality of the original image data 81.

Further, the frequency separation process is the process of generating the plurality of pieces of frequency band data f0 to f5 including the mutually-different frequency bands, by applying the low pass filter to the original image data 81 at stages. The X-ray diagnosis apparatus 100 according to the present embodiment is configured to determine the cutoff frequencies of the low pass filter on the basis of the result of the element detection. Consequently, the X-ray diagnosis apparatus 100 according to the present embodiment is capable of adjusting the frequency bands corresponding to the frequency band data f0 to f5, in accordance with the elements rendered in the original image data 81.

In addition, in the present embodiment, the multi-frequency processing includes the emphasized characteristic adjusting process in which the plurality of pieces of frequency band data f0 to f5 are emphasized or suppressed by applying a coefficient to each of the plurality of pieces of frequency band data f0 to f5. By determining the coefficients used in the emphasized characteristic adjusting process on the basis of the result of the element detection, the X-ray diagnosis apparatus 100 according to the present embodiment is capable of individually emphasizing or suppressing each of the pieces of frequency band data f0 to f5, in accordance with the elements rendered in the original image data 81.

Also, the X-ray diagnosis apparatus 100 according to the present embodiment is configured to detect the types of the elements rendered in the original image data 81 and the image regions 70 rendering the elements and to further determine the parameters on the basis of the types of the detected elements and the sizes of the image regions 70 from which the elements were detected. Consequently, the X-ray diagnosis apparatus 100 according to the present embodiment is capable of identifying, with a high level of precision, the cutoff frequencies for separating the frequency band data f0 to f5 suitable for improving the image quality of the display-purpose X-ray image data, as well as the parts of the frequency band data f0 to f5 to be emphasized or suppressed, in accordance with the frequency characteristics of the elements rendered in the original image data 81.

Further, the X-ray diagnosis apparatus 100 according to the present embodiment is configured to calculate, with respect to each of the elements, the percentage of the original image data 81 accounted for by the image region 70 rendering the element and to further determine the threshold values to be used in the frequency separation process on the basis of the calculated percentages. Consequently, the X-ray diagnosis apparatus 100 according to the present embodiment is capable of separating the frequency bands corresponding to the elements rendered in the original image data 81 more finely than the frequency band corresponding to the background region 60 and to subsequently emphasize any of the frequency band data f0 to f5 that falls in the frequency bands corresponding to the elements. As a result of this process, the X-ray diagnosis apparatus 100 according to the present embodiment is able to improve the visibility of the elements in the display-purpose X-ray image data.

Furthermore, the X-ray diagnosis apparatus 100 according to the present embodiment is configured to input the original image data 81 to the trained model 90 and to obtain the segmentation result output from the trained model 90, the trained model 90 having learned the plurality of pieces of learning-purpose X-ray image data and the segmentation results of the elements included in the plurality of pieces of learning-purpose X-ray image data. Consequently, the X-ray diagnosis apparatus 100 according to the present embodiment is capable of recognizing, with a high level of precision, the image regions 70 rendering the elements in the original image data 81.

In the present embodiment, the process of "determining the parameters of the multi-frequency processing" includes a process of selecting appropriate values from among presets of image processing including the multi-frequency processing having the mutually-different parameters. In other words, the process of "determining the parameters of the multi-frequency processing" includes not only directly selecting the parameters of the multi-frequency processing, but also indirectly determining the parameters of the multi-frequency processing by selecting from the presets of the image processing. For example, on the X-ray image data, various types of image processing processes such as a filtering process may be performed, besides the multi-frequency processing. Thus, the determining function 122 of the X-ray diagnosis apparatus 100 may be configured to select one parameter set from among a plurality of parameter sets that are pre-set for processes including the multi-frequency processing and the various types of image processing processes.

Second Embodiment

In the first embodiment described above, the parameters of the multi-frequency processing are determined on the basis of the percentages of the areas of the image regions 70 rendering the elements within the original image data 81. In contrast, in a second embodiment, the parameters of the multi-frequency processing are determined in accordance with combinations of overlapping image regions 70.

The X-ray diagnosis apparatus 100 according to the present embodiment has a configuration similar to that in the first embodiment explained with reference to FIG. 1.

Similarly to the first embodiment, the image computation circuit 12 according to the present embodiment includes the obtaining function 120, the detecting function 121, the determining function 122, the frequency separating function 123*a*, the emphasizing function 123*b*, and the combining function 123*c*. The obtaining function 120, the detecting function 121, the frequency separating function 123*a*, the emphasizing function 123*b*, and the combining function 123*c* have similar functions to those in the first embodiment. Further, the other constituent elements of the X-ray diagnosis apparatus 100 also have similar functions to those in the first embodiment.

The determining function 122 according to the present embodiment is configured to recognize a section in which two or more of the image regions 70 rendering mutually-different types of elements overlap with each other, on the basis of the result of the element detection by the detecting function 121. Further, when the two or more of the image regions 70 overlap with each other, the determining function 122 is configured to determine the parameters of the multi-frequency processing in accordance with the types of the elements corresponding to the overlapping image regions 70. For example, the determining function 122 according to the present embodiment is configured to judge overlapping of the elements and to optimize the parameters of the multi-frequency processing to be applied to the entirety of the original image data 81 in a direction that optimizes visibility of the image regions 70 in which the elements are overlapping with each other.

Figure 6:
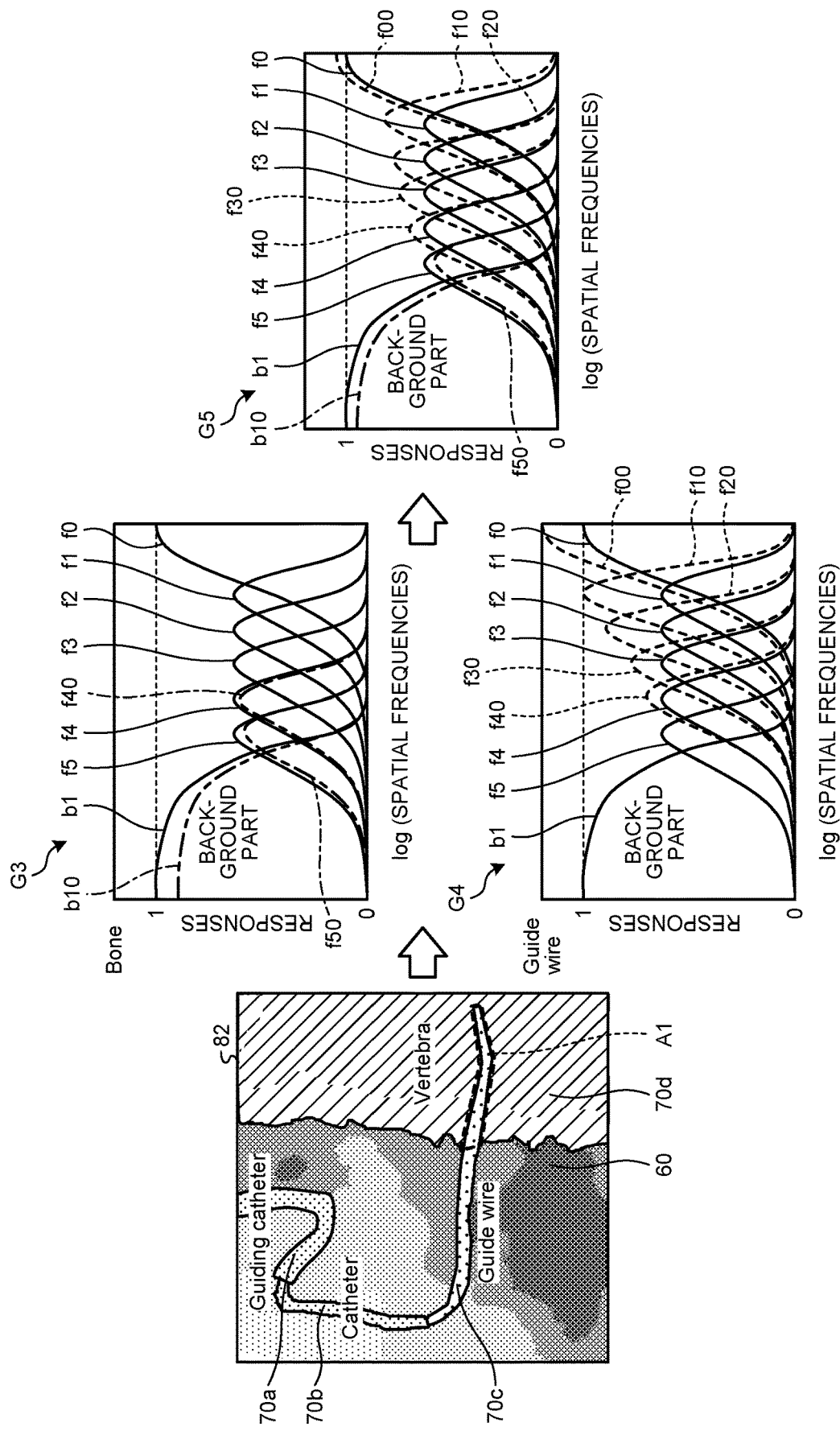
FIG. 6 is a drawing illustrating an example of a parameter adjustment in multi-frequency processing according to a second embodiment.

FIG. 6 is a drawing illustrating an example of a parameter adjustment in the multi-frequency processing according to the second embodiment. The determining function 122 is configured to recognize, through an image processing process, a section in which two or more image regions 70 overlap with each other within the region divided image data 82 segmented by the detecting function 121.

In graphs G3 to G5 in FIG. 6, the frequency band data f0 to f5 and the background data b1 before the coefficients are applied thereto are indicated with solid lines. In contrast, post-correction frequency band data f10 to f50 and background data b10 that have been emphasized or suppressed with the coefficients are indicated with broken lines.

In the example in FIG. 6, the image region 70*c* rendering a guide wire and the image region 70*d* rendering the vertebra overlap with each other in an overlap region A1. Among the elements, when an image region 70 rendering a body tissue such as the vertebra or the diaphragm overlaps with another image region 70 rendering a device such as a guide wire, visibility of the device in the X-ray image data is lowered.

In this situation, with respect to the frequency band data f0 to f5 and the background data b1, by suppressing the lower frequency side and emphasizing the higher frequency side, it is possible to realize display in which the vertebra is suppressed while the device is emphasized.

The graph G3 illustrates an example in which the background data b1 and the frequency band data f4 and f5 on the lower frequency side are suppressed for the purpose of suppressing the display of the vertebra. In the example in FIG. 6, among the frequency band data f0 to f5 and the background data b1, the determining function 122 is configured to cause the coefficients corresponding to the data on the lower frequency side subject to the suppression to be values smaller than 1. For example, the determining function 122 is configured to determine the values of the coefficients in such a manner that the lower the frequency is, the smaller values the coefficients have. It is assumed, for example, that the values of the coefficients are saved in the memory 11 in advance while being kept in correspondence with the elements subject to the suppression.

Further, the graph G4 illustrates an example in which the frequency band data f0 to f4 on the higher frequency side are emphasized for the purpose of emphasizing the guide wire. Among the frequency band data f0 to f5, the determining function 122 is configured to cause the coefficients corresponding to the data on the higher frequency side subject to the emphasis to be values larger than 1. For example, the determining function 122 is configured to determine the values of the coefficients in such a manner that the higher the frequency is, the larger values the coefficients have. It is assumed, for example, that the values of the coefficients are saved in the memory 11 in advance while being kept in correspondence with the elements subject to the emphasis.

The graph G5 illustrates an example of a result of combining together the coefficients presented in the graphs G3 and G4. For example, as for the coefficient for the frequency band data f4 of which the height of the spatial frequency is medium, mutually-different values are applied thereto in the graph G3 and the graph G4. Thus, the determining function 122 may determine an average value of the two values as the coefficient for the frequency band data f4. For example, a memory may store therein a set of coefficients corresponding to elements to be suppressed and a set of coefficients corresponding to elements to be emphasized. In that situation, the determining function 122 is configured to determine the values of coefficients to be used in common throughout the entirety of the original image data 81, by combining the set of coefficients corresponding to the elements to be suppressed with the set of coefficients corresponding to the elements to be emphasized. However, possible methods for combining mutually-different coefficients together are not limited to calculating an average value. It is acceptable to adopt any of various types of calculations.

Further, although FIG. 6 illustrates the example in which the background data b1 is suppressed, whereas the frequency band data f0 to f4 on the higher frequency side are emphasized, what is emphasized and what is suppressed may vary depending on the combination of the types of the overlapping elements.

For example, when an image region 70 rendering a lung field overlaps with another image region 70 rendering a device, because the lung field is rendered bright in X-ray image data, an artifact may occur when the lung field overlaps with the device. For this reason, when the image region 70 rendering the lung field overlaps with the image region 70 rendering the device, the determining function 122 is configured to ensure visibility of the device in the X-ray image data, by suppressing the data having the frequencies corresponding to the lung field among the frequency band data f0 to f4.

Similarly to the first embodiment, the multi-frequency processing function 123 according to the present embodiment is configured to generate display-purpose X-ray image data, by executing the multi-frequency processing on the original image data 81, on the basis of the parameters determined by the determining function 122. Further, similarly to the first embodiment, the display controlling circuit 33 is configured to cause the monitor 34 to display the generated display-purpose X-ray image data.

As explained above, the X-ray diagnosis apparatus 100 according to the present embodiment is configured to recognize the section in which the plurality of image regions 70 rendering the mutually-different types of elements overlap with each other on the basis of the result of the element detection and to further determine the parameters of the multi-frequency processing in accordance with the types of the elements of which the image regions 70 overlap with each other. Consequently, the X-ray diagnosis apparatus 100 according to the present embodiment is able to reduce the visibility degradation caused by the elements overlapping with each other, in addition to the advantageous effects similar to those of the first embodiment.

Further, the X-ray diagnosis apparatus 100 according to the present embodiment is configured to determine the parameters of the multi-frequency processing to be used in common throughout the entirety of the original image data 81. Consequently, the X-ray diagnosis apparatus 100 according to the present embodiment is able to simplify the image processing processes by using the parameters unified for the entire image and to also make adjustments so as to improve the visibility of the entire image.

Third Embodiment

In the first and the second embodiments described above, the multi-frequency processing is executed by applying the parameters used in common throughout the entirety of the original image data 81. In a third embodiment, multi-frequency processing is executed by using mutually-different parameters in correspondence with the image regions 70 rendering various elements.

The X-ray diagnosis apparatus 100 according to the present embodiment has a similar configuration to that in the first embodiment explained with reference to FIG. 1.

Similarly to the first embodiment, the image computation circuit 12 according to the present embodiment includes the obtaining function 120, the detecting function 121, the determining function 122, the frequency separating function 123a, the emphasizing function 123b, and the combining function 123c. The obtaining function 120, the detecting function 121, the frequency separating function 123a, the emphasizing function 123b, and the combining function 123c have similar functions to those in the first embodiment. Further, the other constituent elements of the X-ray diagnosis apparatus 100 also have similar functions to those in the first embodiment.

With respect to each of the image regions 70 rendering the elements in the original image data 81, the determining function 122 according to the present embodiment is configured to determine a parameter corresponding to the type of the rendered element, on the basis of the result of the element detection by the detecting function 121.

More specifically, the determining function 122 is configured to recognize the image regions 70 rendering the elements in the original image data 81 as Regions Of Interest (ROIs).

Figure 7:
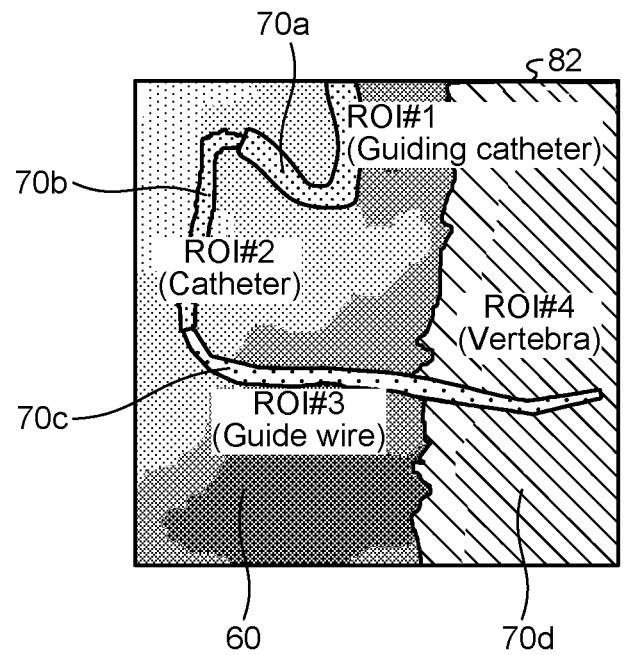
FIG. 7 is a drawing illustrating examples of Regions Of Interest (ROIs) according to a third embodiment.

FIG. 7 is a drawing illustrating examples of the ROIs according to the third embodiment. In the example of FIG. 7, in the region divided image data 82, the image region 70a rendering the guiding catheter is recognized as ROI #1; the image region 70b rendering the catheter is recognized as ROI #2; the image region 70c rendering the guide wire is recognized as ROI #3; and the image region 70d rendering the vertebra is recognized as ROI #4. The quantity of the ROIs correspond to the quantity of the detected elements. Further, the background region 60 is a region that does not correspond to any ROI.

The memory 11 according to the present embodiment has stored therein parameters of the multi-frequency processing corresponding to types of elements. More specifically, the memory 11 has stored therein a table keeping the types of elements in correspondence with groups of coefficients used in the emphasized characteristic adjusting process. In this situation, the "groups of coefficients" denotes a plurality of sets of coefficients corresponding to the frequency band data f0 to f5 and the background data b1. In addition, the memory 11 may further store therein a table keeping the types of elements in correspondence with groups of cutoff frequencies used for separating the frequency band data f0 to f5 and the background data b1.

With respect to each of the image regions 70 rendering the elements in the original image data 81, the determining function 122 according to the present embodiment is configured to select a parameter corresponding to the type of the rendered element, from the memory 11.

The groups of coefficients corresponding to the types of elements will be explained with reference to FIGS. 8 to 10.

Figure 8:
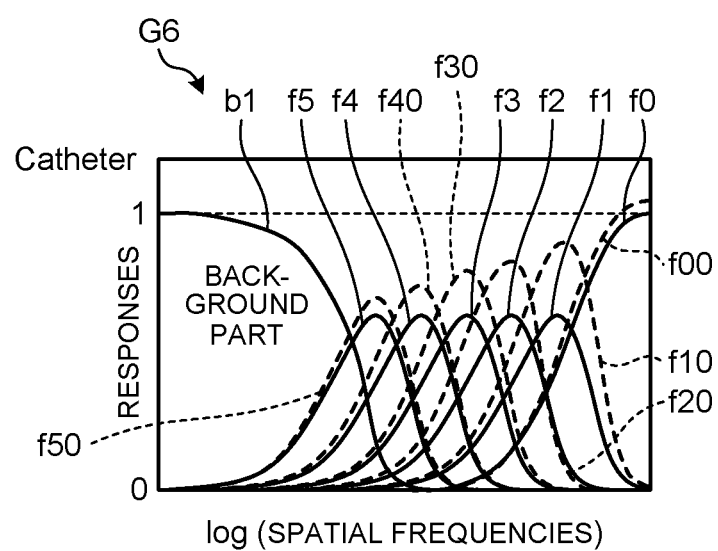
FIG. 8 is a chart illustrating an example of frequency band data and background data to which a group of coefficients corresponding to a catheter is applied according to the third embodiment.

FIG. 8 is a chart illustrating an example of the frequency band data f0 to f5 and the background data b1 to which a group of coefficients corresponding to the catheter is applied according to the third embodiment. In the graph G6 in FIG. 8, the frequency band data f0 to f5 and the background data b1 before the coefficients are applied thereto are indicated with solid lines, whereas the post-correction frequency band data f00 to f50 emphasized or suppressed with the coefficients are indicated with broken lines. In the group of coefficients corresponding to the image region 70b rendering the catheter, i.e., ROI #2, the coefficients increase toward the higher frequency side so as to apply more emphasis, as illustrated in FIG. 8.

Figure 9:
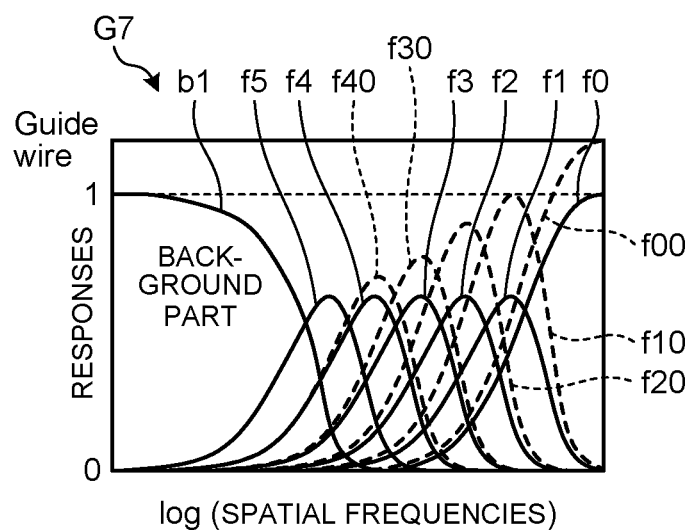
FIG. 9 is a chart illustrating another example of the frequency band data and the background data to which a group of coefficients corresponding to a guide wire is applied according to the third embodiment.

Further, FIG. 9 is a chart illustrating another example of the frequency band data f0 to f5 and the background data b1 to which a group of coefficients corresponding to the guide wire is applied according to the third embodiment. In the graph G7 in FIG. 9, the frequency band data f0 to f5 and the background b1 before the coefficients are applied thereto are indicated with solid lines, whereas the post-correction frequency band data f00 to f40 emphasized or suppressed with the coefficients are indicated with broken lines. In the group of coefficients corresponding to the image region 70c rendering the guide wire, i.e., ROI #3, the coefficients increase toward the higher frequency side so as to apply even more emphasis than the coefficients corresponding to ROI #2 do, as illustrated in FIG. 9. Generally speaking, guide wires are devices that are slenderer than catheters. Thus, the size of the image region 70c rendered in the original image data 81 is smaller. For this reason, the visibility of the image region 70c is improved by further applying more emphasis to the higher frequency side with respect to ROI #3 than with respect to ROI #2.

Figure 10:
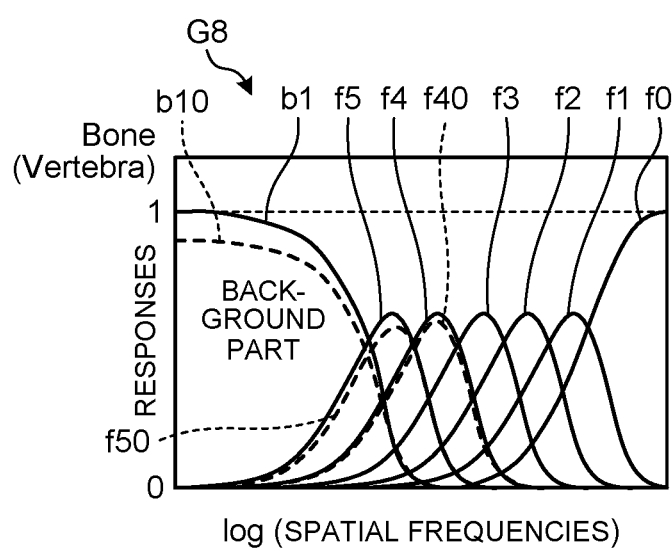
FIG. 10 is a chart illustrating yet another example of the frequency band data and the background data to which a group of coefficients corresponding to bones is applied according to the third embodiment.

Further, FIG. 10 is a chart illustrating yet another example of the frequency band data f0 to f5 and the background data b1 to which a group of coefficients corresponding to bones is applied according to the third embodiment. In FIG. 10, the vertebra is illustrated as an example of the bones.

In the graph G8 in FIG. 10, the frequency band data f0 to f5 and the background data b1 before the coefficients are applied thereto are indicated with solid lines, whereas the post-correction background data b10 and frequency band data f40 and f50 emphasized or suppressed with the coefficients are indicated with broken lines.

As illustrated in FIG. 10, in the group of coefficients corresponding to the image region 70d rendering the vertebra, i.e., ROI #4, the coefficients decrease toward the lower frequency side so as to apply more suppression, with respect to the frequency band data f0 to f5 and the background b1. Accordingly, even when the other ROIs rendering the devices such as the guide wire overlap with ROI #4, it is possible to maintain the visibility of the devices because the display of ROI #4 is not emphasized.

Further, the determining function 122 may be configured to apply weights to the coefficients within the ROIs, for the purpose of lowering the possibility of causing the boundaries of the ROIs in the display-purpose X-ray image data to be visually non-contiguous due to differences in the coefficients. For example, it is also acceptable to gradually use mutually-different groups of coefficients within a single ROI, in such a manner that the shorter the distance is to the boundary with another ROI, the smaller are the differences from the group of coefficients applied to said another ROI. By decreasing the differences between the groups of coefficients at the boundary of the ROIs in this manner, it is possible to reduce feelings of incongruity that may be experienced by the user viewing the X-ray image.

Further, in the present embodiment, the example was explained in which the parameters corresponding to the elements are stored in the memory 11. Alternatively, the determining function 122 may be configured to calculate the parameters corresponding to the elements, in accordance with the segmentation result of the original image data 81.

Further, as for the background region 60 corresponding to none of the ROIs, it is acceptable to apply thereto the parameters stored in the memory 11 in advance or to apply thereto other image processing processes different from the multi-frequency processing.

The multi-frequency processing function 123 according to the present embodiment is configured to individually execute the multi-frequency processing with respect to each of the ROIs, on the basis of the parameters determined by the determining function 122 in correspondence with the ROIs. The multi-frequency processing function 123 is configured to generate display-purpose X-ray image data, by integrating the ROIs to which the multi-frequency processing has individually been executed, with the background region 60.

Further, similarly to the first embodiment, the display controlling circuit 33 is configured to cause the monitor 34 to display the generated display-purpose X-ray image data.

As explained above, the X-ray diagnosis apparatus 100 according to the present embodiment is configured to determine the parameters corresponding to the types of the rendered elements, with respect to each of the image regions 70 rendering the elements within the original image data 81. Consequently, the X-ray diagnosis apparatus 100 according to the present embodiment is able to execute the multi-frequency processing that is appropriate for each of the image regions 70 rendering the elements, while achieving the advantageous effects of the first embodiment.

More specifically, the X-ray diagnosis apparatus 100 according to the present embodiment includes the memory 11 storing therein the parameters corresponding to the types of the elements and is configured to select, from the memory 11, the parameter corresponding to the type of the rendered element with respect to each of the image regions 70 rendering the elements within the original image data 81. Consequently, the X-ray diagnosis apparatus 100 according to the present embodiment is capable of easily applying the parameters corresponding to the types of the elements, to the image regions 70.

First Modification Example

In the embodiments described above, the X-ray diagnosis apparatus 100 is configured to determine the parameters of the multi-frequency processing on the basis of the result of detecting the elements rendered in the original image data 81; however, the X-ray diagnosis apparatus 100 may be configured to determine the parameters of the multi-frequency processing, further in accordance with image taking conditions or examination protocols.

For example, the determining function 122 according to the present modification example is configured to determine the parameters on the basis of one or both of the examination protocols and the image taking conditions used at the time of taking the X-ray image data. As explained in the first embodiment, the image taking conditions include the settings related to an imaging system, an imaging field of view, a magnification ratio, and an X-ray condition. Further, as explained in the first embodiment, the imaging system denotes definition items or information related to the positional relationship between a apparatus used in an imaging process and the patient P and/or the positional relationship between apparatuses used in an imaging process and includes an SID, an SSD, the height of the table 17, and a rotation amount of the holding arm 5. For example, the determining function 122 is configured to determine the parameters on the basis of at least one selected from among the following used for imaging the patient P: the examination protocols, an imaging field of view, a magnification ratio, the X-ray condition, and the positional relationship between a apparatus used in the imaging process and the patient P.

Further, for example, when the parameters are determined on the basis of the examination protocols and the image taking conditions, the memory 11 according to the present modification example has stored therein a table keeping examination protocols, image taking conditions, and parameters of the multi-frequency processing in correspondence with one another.

Figures 11, 12:
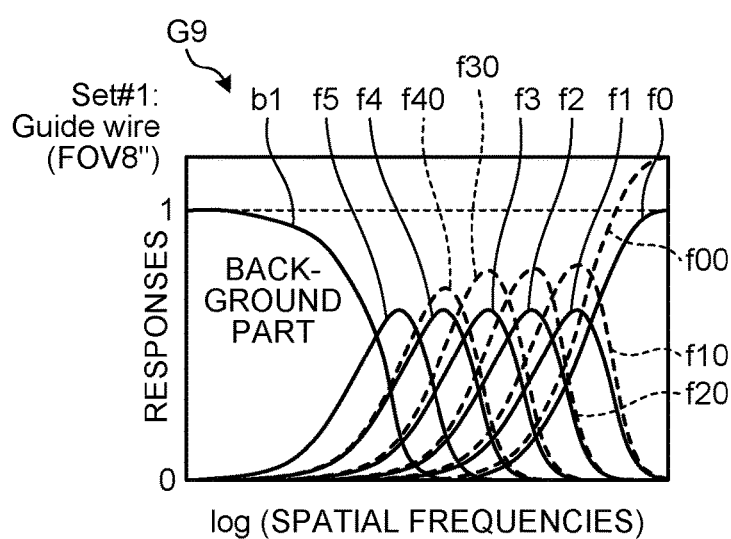
FIG. 11 a drawing illustrating an example of a table registering therein parameters of multi-frequency processing according to a first modification example.
FIG. 12 is a chart illustrating an example of the frequency band data and background data to which a parameter set is applied according to the first modification example.

FIG. 11 is a drawing illustrating an example of a table 111 registering therein the parameters of the multi-frequency processing according to the first modification example. As illustrated in FIG. 11, the table 111 has registered therein parameter set numbers, examination protocols, image taking conditions, groups of offset frequencies, and groups of coefficients that are kept in correspondence with one another.

The groups of offset frequencies are a plurality of sets of offset frequencies used for separating the frequency band data f0 to f5 and the background data b1. Further, the groups of coefficients are a plurality of sets of coefficients corresponding to the frequency band data f0 to f5 and the background data b1. A group of offset frequencies and a group of coefficients corresponding to a set made up of examination protocols and image taking conditions will be referred to as a parameter set. The parameter set numbers are identification information for identifying each of the parameter sets.

The structure of the table 111 presented in FIG. 11 is merely an example, and possible embodiments are not limited to this example. For instance, although FIG. 11 illustrates the example in which the plurality of parameter sets are registered in the single table 111, it is also acceptable to provide one table for each of the parameter sets. Further, although FIG. 11 illustrates the example in which the table 111 has registered therein both the groups of offset frequencies and the groups of coefficients, it is also acceptable to keep only one of the two in correspondence with the examination protocols and the image taking conditions.

Furthermore, although FIG. 11 illustrates the example in which both the examination protocols and the image taking conditions are kept in correspondence with the parameters, it is also acceptable to keep only one of the two in correspondence with the parameters. In addition, it is also acceptable to further have other types of information registered in the table 111 so as to be kept in correspondence with the parameters.

The determining function 122 according to the present modification example is configured to read a parameter set corresponding to the examination protocols and the image taking conditions to be used for imaging the patient P, from the table 111 stored in the memory 102 and to further determine the parameters included in the read parameter set as the parameters of the multi-frequency processing executed on the original image data 81.

Figure 13:
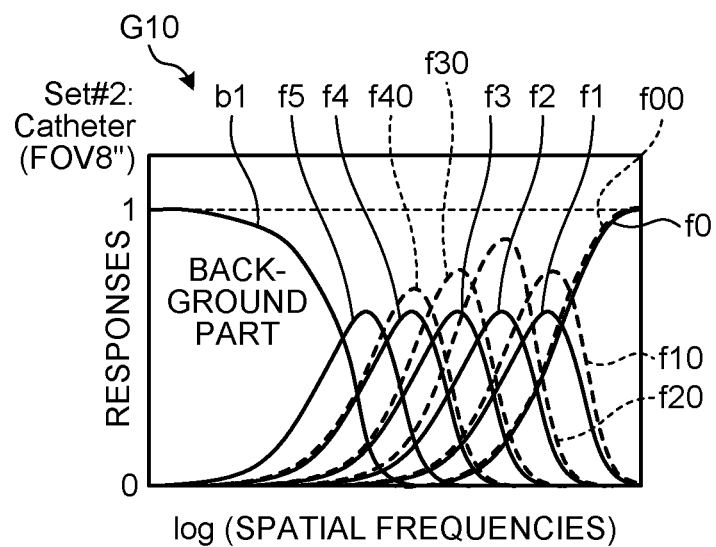
FIG. 13 is a chart illustrating another example of the frequency band data and the background data to which a parameter set different from that in FIG. 12 is applied.

FIG. 12 is a chart illustrating an example of the frequency band data f0 to f5 and the background data b1 to which a parameter set is applied according to the first modification example. Further, FIG. 13 is a chart illustrating another example of the frequency band data f0 to f5 and the background data b1 to which a parameter set different from that in FIG. 12 is applied. As indicated by the graphs G9 and G10 in FIGS. 12 and 13, the results of the multi-frequency processing vary depending on the parameter sets.

For example, depending on the examination protocols and the image taking conditions, the types and the positions of the elements included in the imaging field of view change. For this reason, by storing in advance the parameters that can improve the image quality of the display-purpose X-ray image data, with respect to each set of examination protocols and image taking conditions, it is possible to identify the parameters corresponding to the elements included in the imaging field of view.

More specifically, the types and the positions of the elements included in the imaging field of view change, depending on the positional relationship between the apparatuses used in the imaging process and the patient P, i.e., the imaging geometry. The positional relationship between the apparatuses used in the imaging process and the patient P is defined by, for example, an SID, the height of the table 17, and a rotation amount of the holding arm 5. Consequently, the determining function 122 according to the present modification example is configured to determine the parameters on the basis of any of the SID, the height of the table 17, and the rotation amount of the holding arm 5 that are included in the image taking conditions.

Further, the determining function 122 may be configured to further change the parameter set read from the table 111 on the basis of the elements detected from the original image data 81. For example, the determining function 122 may be configured to determine the parameters by correcting the parameters corresponding to the examination protocols and the image taking conditions by using any of the methods described above in the first to the third embodiments.

In the present modification example, the method was explained by which the parameters corresponding to the examination protocols and the image taking conditions are identified by reading one of the parameter sets registered in the table 111; however, it is acceptable to use other methods. For example, the determining function 122 may be configured to identify the parameters corresponding to the examination protocols and the image taking conditions by using a mathematical expression or an algorithm.

For example, the determining function 122 may be configured to estimate the positional relationship between the apparatuses used in the imaging process and the patient P, i.e., the imaging geometry, on the basis of the image taking conditions so as to calculate appropriate parameters in accordance with the estimated imaging geometry.

Second Modification Example

In the embodiments described above, the segmentation result of the original image data 81 is used for the internal process of determining the parameters of the multi-frequency processing; however, the segmentation result may also be used for display purposes. For example, the display controlling circuit 33 may be configured to cause the monitor 34 to display labels indicating the types of the elements detected from the original image data 81, the ROIs set in correspondence with the image regions 70 in the third embodiments, and the like.

Figure 14:
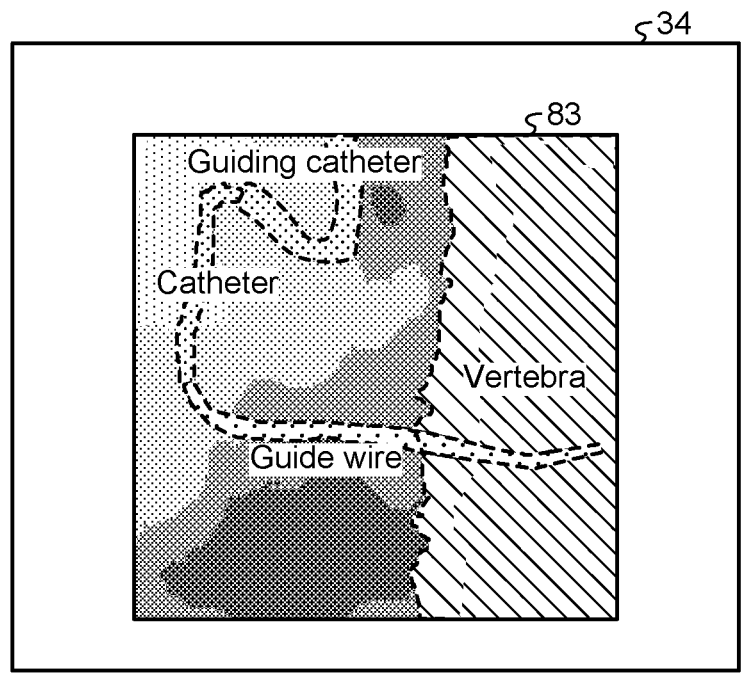
FIG. 14 is a drawing illustrating an example of display on a monitor according to a second modification example.

FIG. 14 is a drawing illustrating an example of display on the monitor 34 according to a second modification example. In the example of FIG. 14, the display controlling circuit 33 has caused the monitor 34 to display a display-purpose image 83 obtained by superimposing the labels indicating the types of the detected elements and boundary lines of the image regions 70 over the display-purpose X-ray image data. When the segmentation result of the original image data 81 is displayed in this manner, the user is able to easily understand which sections of the display-purpose X-ray image data are detected as what elements.

Third Modification Example

In the first embodiment describe above, the example was explained in which every time a new frame of the original image data 81 is obtained, the detecting function 121 and the determining function 122 are configured to determine the parameters of the multi-frequency processing corresponding to the most up-to-date imaged state; however, possible examples of how often the parameters are updated are not limited to this example. For example, it is acceptable to keep using the same set of parameters while the image taking conditions remain unchanged.

More specifically, the determining function 122 may be configured to determine the parameters of the multi-frequency processing on the basis of a number of frames of the original image data 81 counted from the start of the imaging process so as to use the same set of parameters thereafter, unless the user changes the imaging system, the FOV, or the magnification ratio.

Alternatively, the determining function 122 may be configured to update the parameters of the multi-frequency processing once every predetermined number of frames or once every predetermined period of time. Until an update is made, the multi-frequency processing function 123 is configured to execute the multi-frequency processing by using the parameters determined at the time of the past update.

Further, the determining function 122 may be configured to change how often the parameters are updated in accordance with the imaged body site. It is possible to identify the imaged body site from the examination protocols being set, for example. When the same imaging system keeps being used while the imaged body site is the head or a leg region of the patient P having little movement, for example, the determining function 122 may be configured to keep using the parameters applied to past frames. Further, the determining function 122 may be configured to determine the parameters, not only on the basis of the result of the element detection from one frame, but by putting together the results of the element detection from a plurality of frames.

Further, with respect to an imaged body site of the patient P where periodical movements are expected such as a heart region, the determining function 122 may be configured to save, in the memory 11, parameters determined on the basis of a plurality of pieces of original image data 81 corresponding to one heartbeat cycle. In that situation, the multi-frequency processing function 123 may be configured to read the parameters from the memory 11 through an electrocardiographic synchronization with heartbeats so as to use the read parameters for the multi-frequency processing.

Fourth Modification Example

For the processes using the trained model 90 described in the above embodiments, it is also acceptable to use methods other than the trained model 90. For example, the detecting function 121 may be configured to detect the elements from the original image data 81, by performing an image recognition process that does not use deep learning.

FIFTH MODIFICATION Example

In the embodiments described above, the example was explained in which the X-ray image data subject to the segmentation for detecting the elements and the X-ray image data subject to the multi-frequency processing are the same X-ray image data (the original image data). However, the original image data subject to the segmentation does not necessarily have to be the same as the original image data subject to the multi-frequency processing.

For example, when the X-ray diagnosis apparatus 100 is configured to detect the elements, to determine the parameters, and to execute the multi-frequency processing in a real-time manner while successively taking pieces of original image data, a second piece of original image data is taken while the segmentation process and the parameter determining process are performed on a first piece of original image data. In that situation, the multi-frequency processing function 123 of the X-ray diagnosis apparatus 100 may be configured to execute multi-frequency processing using the parameters based on the elements detected from a piece of original image data subject to the segmentation, on another piece of original image data taken later than the piece of original image data subject to the segmentation. Said another piece of original image data is an example of another piece of X-ray image data in the present modification example.

In other words, the multi-frequency processing function 123 according to the present modification example is configured to execute the multi-frequency processing on one or both of the "original image data subject to the segmentation" and "another piece of original image data taken later than the piece of original image data", on the basis of the parameters determined by the determining function 122.

The phrase "another piece of X-ray image data" subject to the multi-frequency processing may denote a piece of original image data taken immediately after the piece of original image data subject to the segmentation or may denote another piece of original image data taken further later.

Sixth Modification Example

The processes described in the above embodiments as being performed by the X-ray diagnosis apparatus 100 may be performed by an information processing apparatus different from the X-ray diagnosis apparatus 100. The information processing apparatus different from the X-ray diagnosis apparatus 100 may be, for example, a Personal Computer (PC), a tablet terminal, a server apparatus, a workstation, or the like. These information processing apparatuses are examples of a medical image processing apparatus in the present modification example.

For example, the medical image processing apparatus may include the image computation circuit 12 which includes the obtaining function 120, the detecting function 121, the determining function 122, the frequency separating function 123a, the emphasizing function 123b, and the combining function 123c, as well as the memory 11, the display controlling circuit 33, the monitor 34, and the operating unit 9.

Seventh Modification Example

In the first embodiment above, the example was explained in which the detecting function 121 is configured to detect the blood vessel as an element, while the determining function 122 is configured to identify the frequency bands in which the element is emphasized. In that situation, the determining function 122 or the multi-frequency processing function 123 may be configured to perform the processes with limited timing or for a limited period of time, instead of performing the processes at all times during the imaging process. For example, generally speaking, when blood vessels are imaged, a contrast agent is administered for the patient P. Accordingly, the determining function 122 or the multi-frequency processing function 123 may be configured to determine the timing with which the processes are started or the period of time during which the processes are continued, in accordance with the timing with which the contrast agent is administered.

The various types of data handled in the present disclosure are, typically, digital data.

According to at least one aspect of the embodiments described above, it is possible to determine the appropriate parameters of the multi-frequency processing, in accordance with the elements included in the imaging field of view.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An X-ray diagnosis apparatus, comprising:
a processor coupled to a memory having instructions stored therein that, when executed by the processor, cause the X-ray diagnosis apparatus to:
  detect, in X-ray image data taken of an examined subject, an element rendered on the X-ray image data;
  detect one or both of a type of the detected element and an image region rendering the detected element;
  determine a parameter of multi-frequency processing based on one or both of the detected type of the element and a size of the image region from which the element was detected;
  execute the multi-frequency processing on one or both of the X-ray image data and another piece of X-ray image data taken later than the X-ray image data, based on the determined parameter,
  perform, in the multi-frequency processing, at least a frequency separation process to generate a plurality of pieces of frequency band data separated in correspondence with a plurality of frequency bands, from one or both of the X-ray image data and said another piece of X-ray image data;

determine the parameter of the multi-frequency processing including a threshold value used in the frequency separation process; and separate the plurality of pieces of frequency band data by performing the frequency separation process on one or both of the X-ray image data and said another piece of X-ray image data taken later than the X-ray image data, based on the threshold value included in the parameter.

2. The X-ray diagnosis apparatus according to claim 1, wherein the instructions, when executed by the processor, further cause the X-ray diagnosis apparatus to:

repeatedly obtain the X-ray image data of the examined subject;

repeatedly perform the element detecting process on each newly-obtained piece of the X-ray image data;

repeatedly perform the parameter determining process in conjunction with the element detecting process; and repeatedly execute the multi-frequency processing based on the repeatedly-determined parameter.

3. The X-ray diagnosis apparatus according to claim 1, wherein, the instructions, when executed by the processor, further cause the X-ray diagnosis apparatus to:

generate, in the frequency separation process, the plurality of pieces of frequency band data including mutually-different frequency bands, by applying, at stages, a low-pass filter to one or both of the X-ray image data and said another piece of X-ray image data; and set a cutoff frequency of the low-pass filter as the threshold value.

4. The X-ray diagnosis apparatus according to claim 1, wherein the instructions, when executed by the processor, further cause the X-ray diagnosis apparatus to:

perform, in the multi-frequency processing, at least an emphasized characteristic adjusting process to emphasize or suppress the plurality of pieces of frequency band data by applying a coefficient to each of the plurality of pieces of frequency band data;

determine the parameter of the multi-frequency processing including the coefficient; and perform the emphasized characteristic adjusting process on one or both of the X-ray image data and said another piece of X-ray image data taken later than the X-ray image data, based on the coefficient included in the parameter.

5. The X-ray diagnosis apparatus according to claim 1, wherein the instructions, when executed by the processor, further cause the X-ray diagnosis apparatus to:

determine the parameter based on the detected type of the element and the size of the image region from which the element was detected.

6. The X-ray diagnosis apparatus according to claim 1, wherein the instructions, when executed by the processor, further cause the X-ray diagnosis apparatus to:

calculate, with respect to each element, what percentage of the X-ray image data is accounted for by an image region rendering the element; and determine the threshold value based on the calculated percentages.

7. The X-ray diagnosis apparatus according to claim 1, wherein the instructions, when executed by the processor, further cause the X-ray diagnosis apparatus to input the X-ray image data to a trained model and obtain a segmentation result corresponding to elements included in the X-ray image data and being output from the trained model, the trained model having been trained with a training set of X-ray image data and corresponding ground truth segmentation results of the X-ray image data.

8. The X-ray diagnosis apparatus according to claim 1, wherein the instructions, when executed by the processor, further cause the X-ray diagnosis apparatus to:

recognize a section in which a plurality of image regions rendering mutually-different types of elements overlap with each other based on a detection result of the elements; and determine the parameter in accordance with the types of the elements of which the image regions overlap with each other.

9. The X-ray diagnosis apparatus according to claim 1, wherein the instructions, when executed by the processor, further cause the X-ray diagnosis apparatus to determine the parameter used in common among a plurality of pieces of X-ray image data that include the X-ray image data and said another piece of X-ray image data and that were taken successively.

10. The X-ray diagnosis apparatus according to claim 1, wherein the instructions, when executed by the processor, further cause the X-ray diagnosis apparatus to determine the parameter with respect to each of image regions rendering elements within the X-ray image data.

11. The X-ray diagnosis apparatus according to claim 10, the parameters corresponding to types of the elements are stored in the memory, and the instructions, when executed by the processor, further cause the X-ray diagnosis apparatus to, with respect to each of the image regions rendering the elements within the X-ray image data, select, from the memory, the parameter corresponding to the type of the rendered element.

12. The X-ray diagnosis apparatus according to claim 1, wherein the instructions, when executed by the processor, further cause the X-ray diagnosis apparatus to determine the parameter further based on at least one selected from among the following used at a time of taking the X-ray image data: an examination protocol, an imaging field of view, a magnification ratio, an X-ray condition, or a positional relationship between a apparatus used for taking the X-ray image data and the examined subject.

13. The X-ray diagnosis apparatus according to claim 1, further comprising:

a table on which the examined subject is placed;

an X-ray detector configured to detect X-rays that have passed through the examined subject; and an arm configured to support the X-ray detector, wherein the instructions, when executed by the processor, further cause the X-ray diagnosis apparatus to determine the parameter based on one selected from among: a source image distance, a height of the table, and a rotation amount of the arm.

14. A medical image processing apparatus, comprising a processor coupled to a memory having instructions stored therein that, when executed by the processor, cause the medical image processing apparatus to:

detect, in X-ray image data taken of an examined subject, an element rendered on the X-ray image data;

detect one or both of a type of the detected element and an image region rendering the detected element;

determine a parameter of multi-frequency processing based on one or both of the detected type of the element and a size of the image region from which the element was detected;

execute the multi-frequency processing on one or both of the X-ray image data and another piece of X-ray image data taken later than the X-ray image data, based on the determined parameter;

determine, based on one or both of the type of the detected element and the size of the image region from which the element was detected, the parameter including a threshold value used in a frequency separation process included in the multi-frequency processing, the frequency separation process being configured to generate a plurality of pieces of frequency band data separated in correspondence with a plurality of frequency bands, from one or both of the X-ray image data and said another piece of X-ray image data; and separate the plurality of pieces of frequency band data by performing the frequency separation process on one or both of the X-ray image data and said another piece of X-ray image data taken later than the X-ray image data, based on the threshold value.

15. The medical image processing apparatus according to claim 14, wherein the instructions, when executed by the processor, cause the medical image processing apparatus to:

recognize a section in which a plurality of image regions rendering mutually-different types of elements overlap with each other based on a detection result of the elements; and determine the parameter in accordance with the types of the elements of which the image regions overlap with each other.

16. The medical image processing apparatus according to claim 14, wherein the instructions, when executed by the processor, cause the medical image processing apparatus to determine the parameter used in common among a plurality of pieces of X-ray image data that include the X-ray image data and said another piece of X-ray image data and that were taken successively.

17. The medical image processing apparatus according to claim 14, wherein the instructions, when executed by the processor, cause the medical image processing apparatus to determine the parameter further based on at least one selected from among the following used at a time of taking the X-ray image data: an examination protocol, an imaging field of view, a magnification ratio, an X-ray condition, or a positional relationship between an apparatus used for taking the X-ray image data and the examined subject.

18. A non-transitory computer-readable storage medium having recorded thereon a plurality of instructions executable by a computer, wherein the plurality of instructions cause the computer to perform:

detecting, in X-ray image data taken of an examined subject, an element rendered on the X-ray image data;

detecting one or both of a type of the detected element and an image region rendering the detected element;

determining a parameter of multi-frequency processing based on one or both of the detected type of the element and a size of the image region from which the element was detected;

executing the multi-frequency processing on one or both of the X-ray image data and another piece of X-ray image data taken later than the X-ray image data, based on the determined parameter, performing in the multi-frequency processing, at least a frequency separation process to generate a plurality of pieces of frequency band data separated in correspondence with a plurality of frequency bands, from one or both of the X-ray image data and said another piece of X-ray image data;

determining the parameter of the multi-frequency processing including a threshold value used in the frequency separation process; and separating the plurality of pieces of frequency band data by performing the frequency separation process on one or both of the X-ray image data and said another piece of X-ray image data taken later than the X-ray image data, based on the threshold value included in the parameter.

* * * * *